(No Model.) 6 Sheets—Sheet 1.

W. R. CLOUGH.
MACHINE FOR MAKING CORKSCREWS.

No. 441,137. Patented Nov. 25, 1890.

WITNESSES:

INVENTOR
William R. Clough,
BY
Chas. B. Gill
ATTORNEY (No Model.) W. R. CLOUGH. 6 Sheets—Sheet 2.
MACHINE FOR MAKING CORKSCREWS.

No. 441,137. Patented Nov. 25, 1890.

WITNESSES:

INVENTOR
William R. Clough
BY
Chas. C. Gill
ATTORNEY (No Model.) 6 Sheets—Sheet 3.
W. R. CLOUGH.
MACHINE FOR MAKING CORKSCREWS.

No. 441,137. Patented Nov. 25, 1890.

WITNESSES:

INVENTOR
William R. Clough,
BY
Chas. E. Gill
ATTORNEY

(No Model.) 6 Sheets—Sheet 4.

W. R. CLOUGH.
MACHINE FOR MAKING CORKSCREWS.

No. 441,137. Patented Nov. 25, 1890.

WITNESSES:
INVENTOR
Wm. R. Clough,
BY
Chas. E. Gill
ATTORNEY (No Model.) 6 Sheets—Sheet 6.

W. R. CLOUGH.
MACHINE FOR MAKING CORKSCREWS.

No. 441,137. Patented Nov. 25, 1890.

WITNESSES:
R. A. Porteous
William B. Ellison

INVENTOR
William R. Clough,
BY
Chas. E. Gill
ATTORNEY

UNITED STATES PATENT OFFICE.

WILLIAM R. CLOUGH, OF BROOKLYN, NEW YORK.

MACHINE FOR MAKING CORKSCREWS.

SPECIFICATION forming part of Letters Patent No. 441,137, dated November 25, 1890.

Application filed August 30, 1888. Serial No. 284,188. (No model.)

*To all whom it may concern:*

Be it known that I, WILLIAM R. CLOUGH, a citizen of the United States, and a resident of Brooklyn, in the county of Kings and State of New York, have invented certain new and useful Improvements in Machines for Making Corkscrews, of which the following is a specification.

The invention relates to improvements in machines for making corkscrews; and it consists in novel mechanism and combinations of parts hereinafter fully described and claimed, whereby wire may be automatically fed into a machine in a continuous strand at a definite speed and cut into lengths and each length or piece formed into a corkscrew having an eye or handle and worm, one or both ends of the wire being given scarf-cut or beveled points, all as hereinafter more fully described.

The invention is illustrated in the accompanying drawings, in which—

Figure 1 is a top plan view of a machine embodying the elements of the invention.
Fig. 2 is a side elevation of same.
Fig. 3 is a sectional view of same on the dotted line $x$ $x$ of Fig. 1;
Fig. 4, an enlarged top view of same partly broken away;
Figs. 10 and 11, a bottom and edge view, respectively, of one of the jaws G', hereinafter described;
Fig. 12, a top view of a detached portion of the machine, showing the position of the parts at the time the ends of the length of wire are to be coiled into the worm and helical stop;
Fig. 13, a plan view of the article produced on the machine which is the subject of this application.
Figs. 14 and 15 are edge and side views, respectively, of the stop $u'$, hereinafter referred to;
and Fig. 16 is a vertical section on the dotted line $z''$ $z''$ of Fig. 12. Fig. $1^a$ is an enlarged top plan view of a detached portion of the carriage for feeding the wire. Fig. $1^b$ is an end view of same, the tramway for the carriage being shown in section. Fig. $1^c$ is an enlarged top plan view of a detached portion of the carriage-tramway, with one of the wire-feeding dogs with adjacent devices. Fig. $1^d$ is an end view of same, the tramway being shown in section. Fig. $4^a$ is an enlarged detached top view of the bending arms and appurtenances, with the length of wire for a corkscrew shown in folded position; and Fig. $4^b$ is a side elevation of said length of wire shown in its straight condition. Fig. $9^a$ is an enlarged transverse section through the cutters for severing the lengths of wire for the corkscrews, the section being taken through the cutters at the point where the wire is severed and showing the length of the sliding cutter with its shoulder pressed into the wire; Fig. $9^b$, an enlarged side view of the rod of wire, the cutters being shown by dotted lines; and Fig. $9^c$ is a top view of the length of wire after being severed, the end of the length of wire at the left hand of the view being the pointed end for the point of the corkscrew.

In the drawings, A designates the bed of the machine, B the supporting-legs, and C the main driving-shaft, which is journaled in bearings D and is supplied with belt-wheels E or other means for applying power.

In the description of the machine I will first point out the means for feeding the wire into the machine, then the cutting-tools, and afterward the mechanism whereby the lengths of wire are fashioned into completed corkscrews.

The wire is lettered F and will come from a reel, so that it may be automatically drawn into the machine during the manufacture of the screws. The end of the wire F is first passed through the eye G and the guides H I, secured on the bed-plate A, then along the under side of the cam-wheel J in the annular groove K, formed therein, to the groove L, guide M, and guides N O of the feed-carriage P, after which the wire passes through the upper cutter Q, hereinafter described. The guide H is a block of metal provided with the guiding-groove and is loosely secured to the bed-plate A by screws passing through the elongated slots R, which permit the guide to have a free lateral movement, whereby it may accommodate itself to the position of the wire. The guide I is a stationary stud secured to the bed-plate A, and the cam-wheel J is secured on the driving-shaft C. The wheel J is grooved for the convenient passage of the wire to the feed devices, but is not essential as a guide. The groove L is formed on the upper rear corner of the vertical plate or tramway S, and the guide M consists of a block secured to the tramway S and having the shoulder T and eccentric-wheel V, secured on a pin W and retained in position by the coiled spring X on said pin and by the projection Z, which extends outward over the same from the shoulder T. The feed-carriage P is adapted to travel on the tramway S and carries at one end the cross-bar a, containing a groove, which constitutes the guide N, while at the other end of the carriage is secured the grooved guide-plate O and dog b, the latter being retained by the pin d and coiled spring e and having its edge inserted in the groove of plate O. The dog b is prevented from turning away from the plate O by the pin f, formed on or secured to the carriage. The size and position of the dog b are such that it will pass freely along the wire during the movement of the carriage P toward the driving-shaft and that it will bind against the wire during the opposite movement of the carriage and draw the same with it the length of the travel of said carriage. During the movement of the carriage P toward the driving-shaft the eccentric V binds against the wire and prevents it from being pushed rearward; but during the forward travel of said carriage the eccentric releases the wire and permits the dog b to draw the wire with it into the machine.

The carriage P is secured to the lower end of the swinging rod g, which is pivoted at its upper end to the standard h and is connected by a screw i with the rod j of the eccentric k, mounted upon and deriving its movement from the driving-shaft C. The rod g and rod j are slotted to receive and permit the adjustment of the screw i, and thereby to afford a means of regulating the length of movement imparted to the carriage by the rod g through the action of the eccentric k during the operation of the machine. With every forward movement of the carriage P a given length of wire is drawn into the machine by the dog b and moved through the upper cutter Q in position to be severed from the main body of wire by the action of the movable lower cutter m, hereinafter described, the length thus removed being at the time in position to be folded and coiled in the formation of the corkscrew, this folding and coiling of the severed length of wire taking place while the carriage P is moving toward the driving-shaft P and being completed at the time the carriage has again moved forward and fed another length of wire in position to be severed and fashioned into a completed screw. The length of the wire fed into the machine at each interval may be governed by the extent of the travel of the carriage P on the tramway S, and this, as aforesaid, may be regulated by the adjustment of the screw i, connecting the rods g and j with relation to each other.

Figures 1, 1A, 1B, 1C, 1D:
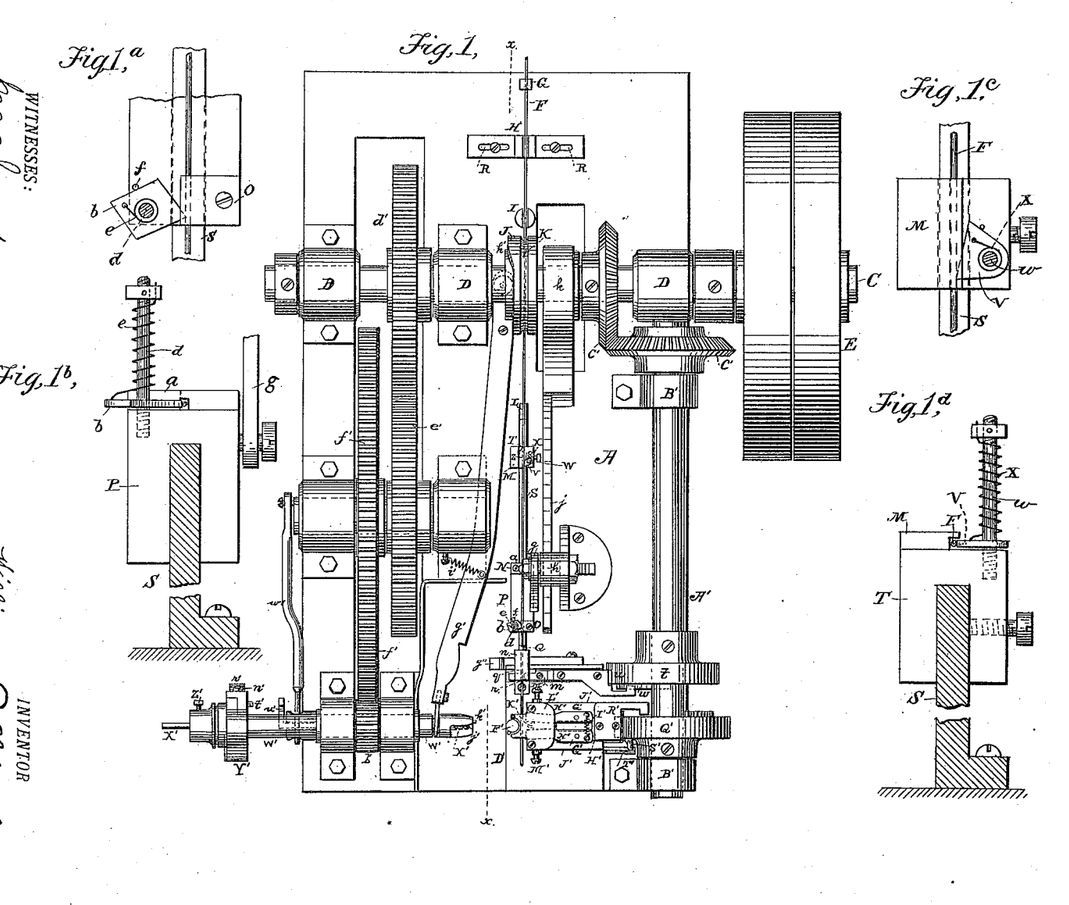
Figures 2, 9B:
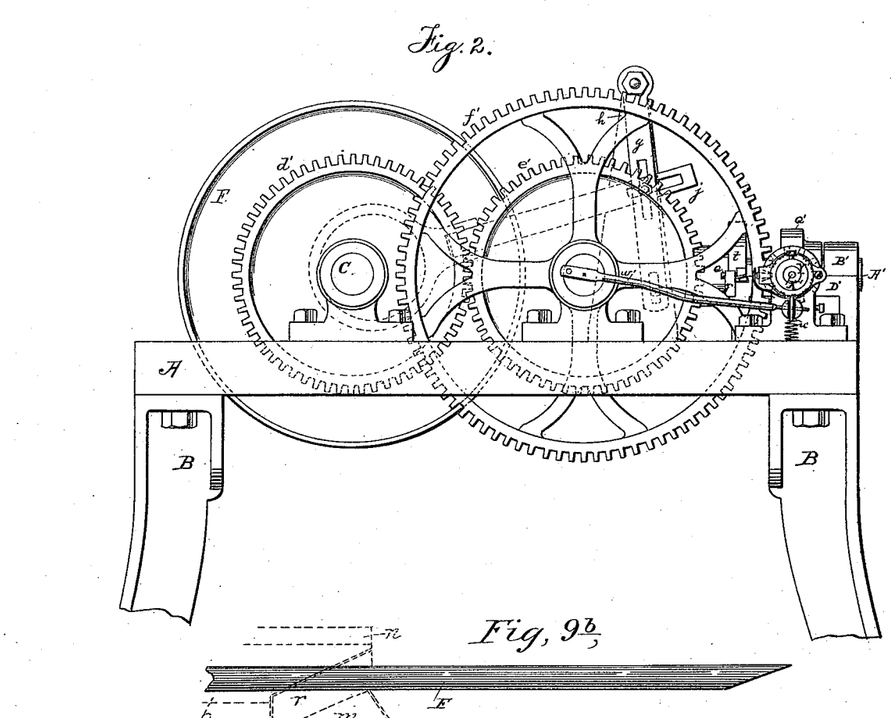
Figures 3, 9A:
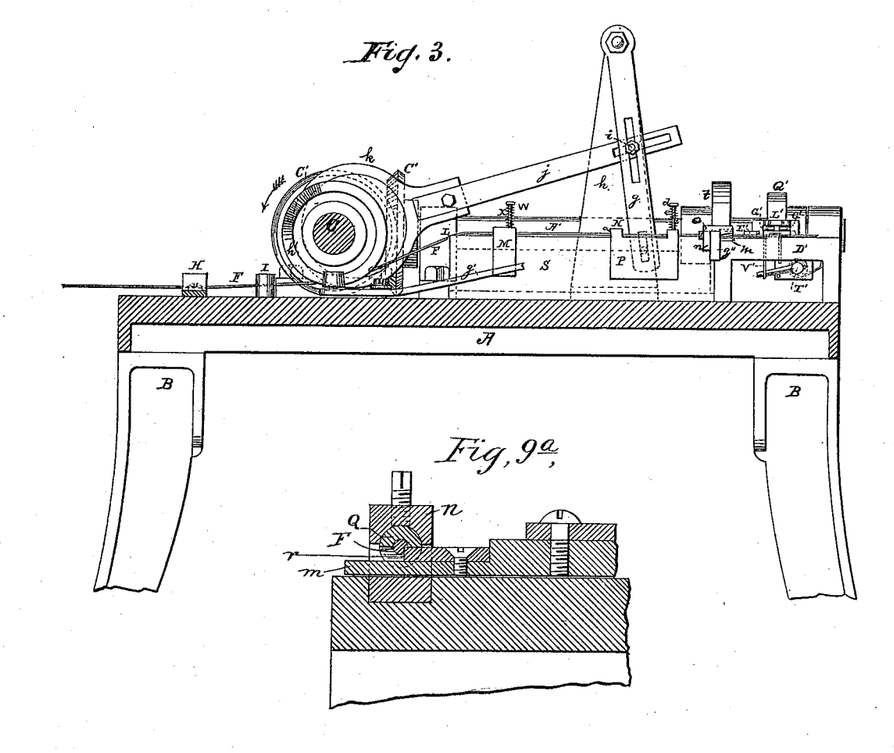
Figures 4, 4A, 4B:
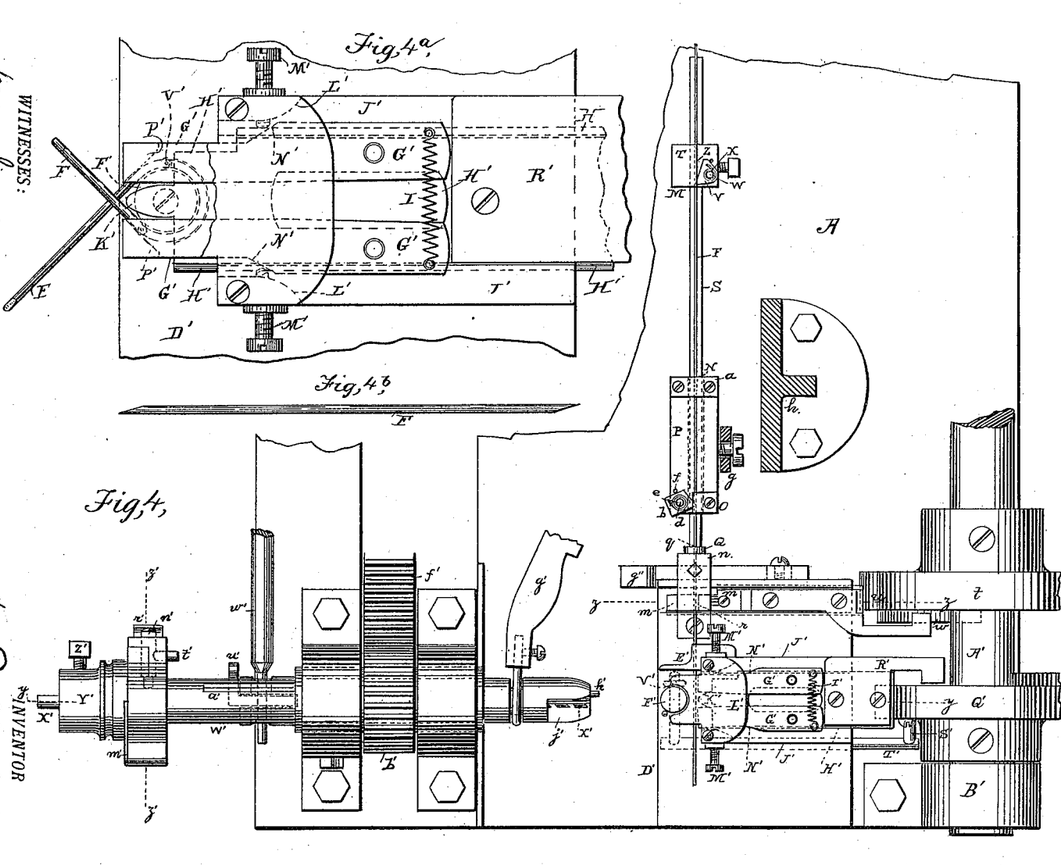
Figures 5, 6, 7, 8:
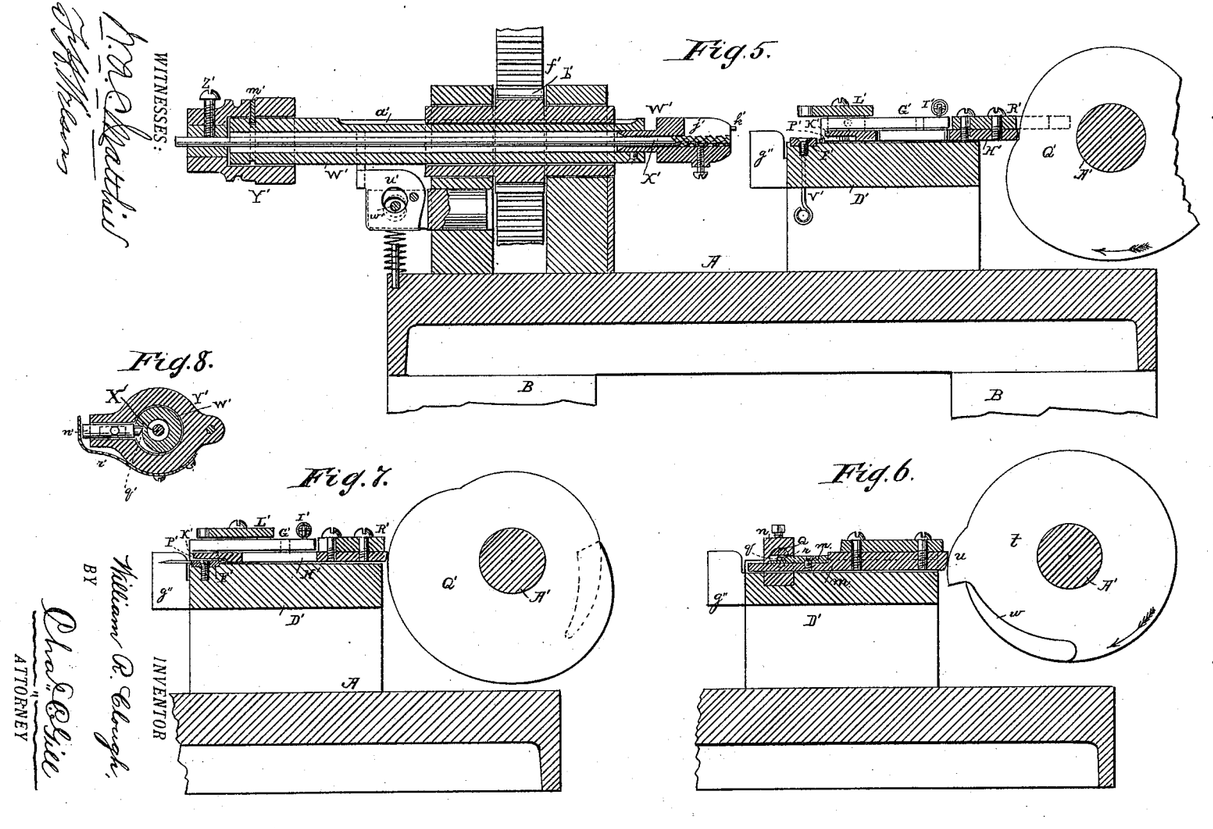
Fig. 5, a section on the dotted line $y$ $y$ of Fig. 4.
Fig. 6, a longitudinal section through the movable cutter on the dotted line $z$ $z$ of Fig. 4.
Fig. 7, a longitudinal section through the slide carrying the former-jaws hereinafter described.
Fig. 8 is a sectional view on the dotted line $z'$ $z'$ of Fig. 4.

The cutter Q is secured in the bearing n and contains the central aperture q, through which the lengths of wire are fed preparatory to being severed by the action of the movable cutter m. The forward lower side of the cutter Q is beveled upward and forward, as shown in Fig. 3, on a suitable inclination with relation to the beveled cutting-shoulder r, formed on the movable cutter m. This consists of a sliding bar arranged to move in a groove provided for it at a right angle to the length of cutter Q and receives its sliding motion from the cam-wheel t, which, during its rotation, operates, owing to the cam-surfaces u w, to alternately move the cutter m across the path of the wire under the cutter Q, severing a length of same, and then to retract said cutter m to its outward position, the outer end of the cutter-bar being conformed to engage said cam-surfaces u w during the rotation of the cam-wheel t. The wheel t is mounted on the auxiliary driving-shaft A', which is journaled in bearings B' B' and receives its motion from the main driving-shaft C through the medium of the bevel gear-wheels C' C'. With every inward movement of the cutter m the shoulder r, in conjunction with the stationary holder and cutter Q, severs a length of wire suitable for the formation of a corkscrew and leaves it on the table D' beneath the finger E' (see Fig. 4) and at the outer side of the hub F' and free to be acted upon by the folding and twisting devices presently to be described.

Figure 9:
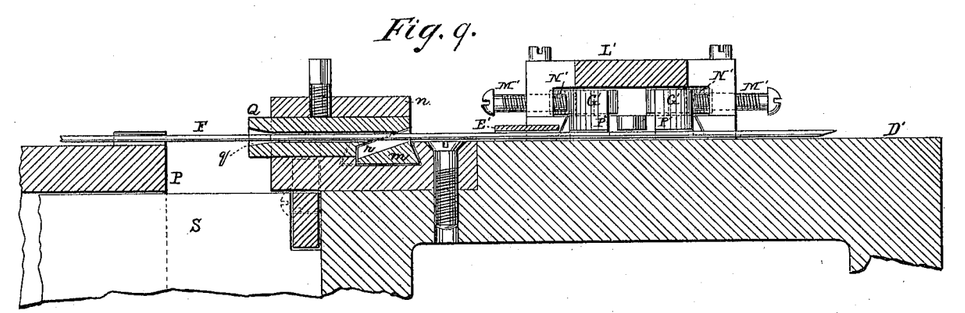
Fig. 9, an enlarged sectional view along the line of travel of the wire.
Figure 9C:
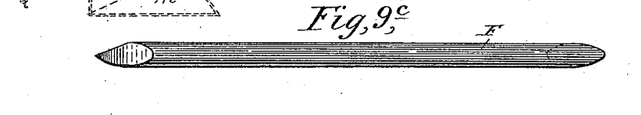

The formation of the cutters Q m will be governed by the character of the effect to be given to the ends of the wire left at the point of severing. The cut may be made at right angles to the length of the wire, and this will leave two flat or blunt ends; but I accomplish a very decided advantage in the manufacture of the goods by beveling the under surface of the cutter Q and the upper surface of the cutter m, which enables me on cutting the wire to leave the ends with scarf-cut points, the point left on the severed length of wire on each movement of the cutter m being different in character from that left on the end of the main body of wire and being admirably adapted without further treatment to enter a cork. The difference between the two scarf-cut ends left by the cutter is due to the fact that that portion of the main body of wire which when the length is severed will constitute the end is held in and protected by the aperture in the cutter Q, and so far as it is concerned the cutter m will make a clean straight cut on a bevel, leaving a broad or rounded point (considered in a transverse direction) with sharp edges, whereas the length of wire to be severed not being within the cutter Q will be given a point which will not be rounded or broad laterally, but will be sharp, as shown at the left-hand end of Fig. 9°, in condition for entrance to the cork. This is formed by the shoulder r of the cutter m first compressing the wire a little in a transverse direction below the line of severance and then cutting through the same, while as to that portion of the wire above the line of severance or within the cutter Q there is no compression, but simply a plain cut on a bevel corresponding with the bevel of the under side of the cutter Q, the absence of compression on this portion of the wire being due to to the fact that it is within and sustained by the aperture in the cutter Q, as shown enlarged in Fig. 9. When the shoulder r of the cutter m comes into contact with the rod of wire, it presses against that portion of said wire not protected by the cutter Q and effects the severance of the length for a corkscrew, and during this action the shoulder r compresses or flattens that edge of the wire against which it bears (see Fig. 9ª) and leaves a sharp point on the severed length, as shown at the left-hand end of Fig. 9°. The end of the wire in the cutter Q will not be compressed or flattened on one edge, since it is on all sides inclosed and protected, while the exposed portion of the wire has nothing to save it from the compression or flattening under the action of the shoulder r.

The end on the main rod of wire left by the cutters forms the forward end of the succeeding length of wire fed forward on the table D', and its point being beveled and rounded laterally will wrap close against the helical coil forming the stop at the shank of the worm of the screw and present a smooth-finished surface, the bevel or cut formed by the cutter facing inward toward the center of the stop or shoulder. I may remark here, however, that the handle of the wire may be left blunt, if preferred, and also that the stop or shoulder may be omitted and the end of the wire left detached from the shank or neck of the cork-screw, if desired. The end of the wire for forming the worm of the screw is the end of each severed length adjacent to the cutters, and during the formation of the worm the cut on this end of the wire also faces inward, leaving a finished exterior surface to view.

As above described, the lengths of wire as cut are left on the table D' beneath the finger E' and at the outer side of the hub F', where they are first folded around said hub by the inward movement of the jaws G' G', pivotally secured upon the upper surface of the slide H' and provided with the coiled spring I', which imparts an outward tension to the inner ends of said jaws. The slide H' is arranged in guides J' and has the finger K' at its front end, which, during the first part of the inward movement of the jaws G' G', comes over the severed length of wire and prevents it from rising over the hub F'. The jaws G' G' are held upon the slide H' by the cap L', which is supplied on opposite sides with the adjusting-screws M', the points of which serve as surfaces against which the cam-surfaces N' of said jaws may move during their travel inward and outward with the slide H'. The purpose of the cam-surfaces N' is to cause the inner ends of the jaws G' G' to close inward and carry the shoulders P' thereof around the inner side of the hub F' during the inward movement of the slide H' and to impart a contrary action in the said jaws while the slide is moving outward. The jaws G' G', being on the slide H', are elevated somewhat above the table D'; but the shoulders P' thereof are secured to or formed on the lower surface of the inner ends of said jaws, and they extend downward to the surface of the table in position during the outward movement of the slide to come against the length of wire and fold it around the hub F'. The slide H' receives its reciprocating movement inward and outward from the auxiliary driving-shaft A' through the medium of the cam Q' thereon and the engaging-arm R', connected with said slide. That portion of the wire folded around the hub F' constitutes the handle of the corkscrew, while the ends of the wire which cross each other on the inner side of the hub are next acted on by the coiling devices and one of them thereby fashioned into the worm and the other into a flat helical coil or stop at the shank end of said worm. The cam Q' also operates through the arm S' and rock-shaft T' to move the ejector V' upward at the proper time to elevate and push off the corkscrew from the hub F', the screws being thus permitted to fall one after another as completed from the table D'.

Figures 10, 11, 12, 13, 14, 15, 16:
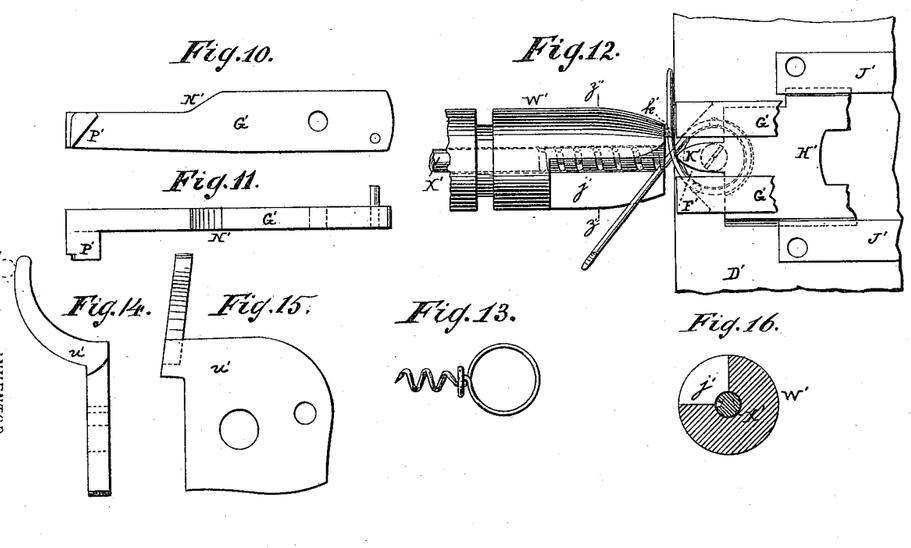

The devices for coiling the ends of the lengths of wire into the worm and stop consist of the hollow chuck W', the spirally-grooved worm-mandrel X' therein, and the head Y', in which the mandrel X' is held by a screw Z', and which is adapted to revolve with the chuck or to remain stationary with the mandrel, as the necessities of the machine may require. The chuck W' is provided with an elongated longitudinal groove a'', by which it is loosely keyed in the hub of the pinion-wheel b', and which permits it to have a reciprocating movement in and to revolve with said wheel. The rotation of the chuck W', and with it the mandrel X' and head Y', is effected from the main driving-shaft C through the gear-wheels d', e', and f', the latter meshing with the pinion b', which engages said chuck and keeps it in constant rotation, and the reciprocating movement of the chuck W', and with it the mandrel X' and head Y', is accomplished by the pivoted arm g', which at one end is engaged by the cam h' on the edge of the wheel J and at the other end itself engages an annular groove formed in the inner end of the chuck. The cam h' actuates the arm g' to move the chuck W' inward toward the hub F', and the spring i' serves thereafter to retract the said arm and chuck to their outward position. A stop $g''$ is provided to limit the inward movement of the arm $g'$. The inner end or head of the chuck W' is formed with the substantially right-angular opening $j'$ and the projecting stud $k'$, and on the inward movement of the chuck against the crossed ends of the length of wire one of said ends will project into said opening $j'$, as shown in Fig. 12, and afterward be fashioned into the worm, while the other end of said length of wire will project rearward, (see Fig. 12,) although before the crossing of said ends it pointed forward, and be coiled into the helical stop by the stud $k'$ during the subsequent rotation of the chuck, as hereinafter described. The head Y' is prevented from slipping from the chuck W' by the key $m'$, which enters an annular groove in the chuck, and thus holds the head in position without interfering with the independent rotation of the chuck. The head Y' is also provided with the pin $n'$, which has a beveled lower end adapted to enter the socket $q'$ provided for it in the chuck W' and to be there held by the spring $r'$ during such time as it is desired that the head and chuck shall revolve together. When the chuck W' has moved inward to engage the crossed ends of the length of wire, as above described, and while it is rotating to coil the worm and helical stop, the head Y' and mandrel X' remain at rest, being at such time prevented from rotating by the pin $t'$ on said head coming against the spring-stop $u'$ and withdrawing the pin $n'$ from the socket $q'$. The spring-stop $u'$ is adapted to be elevated by its spring and to be depressed by the rod $w'$, pivoted eccentrically on the axle of the gear-wheel $f'$.

In the operation of the coiling and twisting devices the chuck W' is first, by means of the arm $g'$, moved inward toward the hub F' and against the crossed ends of the severed length of wire, the mandrel X' and head Y' being on this inward movement carried by the chuck. During this inward movement of the chuck W', mandrel X', and head Y' these parts, being connected, rotate together until the head Y' has moved sufficiently inward to permit the pin $t'$ to come into contact with the stop $u'$, which stop at such time acting on the pin $t'$ withdraws the pin $n'$ from the socket $q'$ of the chuck W', and thus breaks the connection between the head Y' and the chuck, the effect being that the head Y' and mandrel X' are then held stationary, while the chuck continues its revolution. The head or inner end of the chuck W' having been brought against the crossed ends of the severed length of wire and at the same time constantly rotating, (see Fig. 12,) that end of the length of wire in the opening $j'$ will be wrapped into the spiral groove of the now stationary mandrel X', thereby forming the worm, while the other end of said length of wire is at the same time coiled by the stud $k'$ into the helical stop. As soon as the ends of the length of wire have been formed into the worm and stop, as described, the rod $w'$ depresses the spring-stop $u'$ from contact with the pin $t'$ of the head Y', thereby permitting the spring $r'$ to return the pin $n'$ to the socket $q'$ and thus re-establish the connection of the head, mandrel, and chuck, and the arm $g'$ immediately thereafter moves the chuck, with its mandrel X' and head Y', outward again to its first position, these three parts during this outward movement rotating together and unscrewing the mandrel from the corkscrew-worm. At this time the ejector-pin V' is elevated, lifting the now-finished corkscrew from the hub F', and another length of wire has been fed forward on the table D' by the carriage P and severed by the cutters Q $m$ preparatory to the subsequent action of the jaws G' G' and coiling devices. The hub F' is circular in the present instance, and the handle formed on it would be round; but it is evident that the hub may be given the form of an octagon or other configuration adapting it to impart the desired shape to the corkscrew-handles, according to the wish of the manufacturer, and this ring may be large enough for the finger or formed into a small eye, as desired.

It will be observed that the chuck W' constantly rotates, whether or not it is for the moment performing any part of its actual work. This avoids complicated stopping and starting mechanism for the pinion-wheel $b'$ and the gear-wheel $f'$; but in advancing the chuck W' while in a state of rotation to grasp its work the pinion-wheel $b'$ and gear-wheel $f'$ must be so engaged as to present the carrying-slot $j'$ of the chuck to the part of the wire to be coiled at the very moment the chuck has advanced horizontally to its position.

As stated hereinbefore, the stop between the handle and worm of the corkscrew may be dispensed with, if desired; and in such event the handle ends of the lengths of wire would be made shorter, so as only to form the handle when folded around the hub F'. The stud $k'$ on the chuck W' would also under such circumstances be omitted or remain idle, since its office is to form said stop. In the manufacture of corkscrews without the said stop one end of the length of wire is folded around the hub F' to form the eye or handle, while the other end, as above described, enters the opening $j'$ and is coiled into the worm. The opening $j'$ is described as angular, because it extends at an angle to the mandrel X' and forms a carrying-slot for directing the ends of the lengths of wire to the mandrel X', which forms them into the worms of the corkscrews.

What I claim as my invention, and desire to secure by Letters Patent, is—

1. In a machine for making wire corkscrews, a feed-carriage for the wire, the stationary hollow cutter through which the wire passes and having a beveled under surface, and the movable beveled cutter arranged at an angle to the wire, combined with jaws for folding the severed length around a hub, and the chuck and mandrel for coiling the ends of said length, substantially as set forth.

2. In a machine for making wire corkscrews, a feed-carriage for the wire, cutters for severing the lengths of wire for each corkscrew, and jaws for folding the severed lengths around a hub, combined with the rotary and reciprocating coiling devices, consisting of the chuck, the mandrel therein, and the head, the latter being secured to the mandrel and chuck, and the chuck having the angular opening and stud at its head, substantially as set forth.

3. In a machine for making wire corkscrews, a feed-carriage for the wire and the beveled cutters for severing the lengths of wire, leaving scarf-cut points, combined with jaws for folding the severed lengths of wire around a hub and a chuck and mandrel for coiling the ends of the wire, the chuck having the angular opening and stud at its head, substantially as set forth.

4. In a machine for making corkscrews from lengths of wire having scarf-cut points, the table to receive said lengths of wire and the hub on said table, combined with the sliding jaws for folding said lengths around said hub and the chuck and mandrel, the chuck having the angular opening at its head and adapted with the mandrel to form the worm of the screw with the scarf-cut surface folded on the inner side of the worm, substantially as set forth.

5. In a machine for making wire corkscrews, the reciprocating feed-carriage carrying the clutching-dog and the oppositely-acting dog for preventing the wire from being pushed from the machine, combined with the cutters for severing the lengths of wire, jaws for folding said lengths around a hub, and the chuck and mandrel for coiling the ends of said lengths, the chuck having the angular opening and stud at its head, substantially as set forth.

6. In a machine for making corkscrews, the reciprocating feed and cutters for severing the wire into lengths, combined with jaws for folding said lengths around the hub, the chuck and mandrel for coiling the ends of said lengths, the chuck having the angular opening and stud at its head, and the ejector for removing the finished screw from said hub, substantially as set forth.

7. In a machine for making corkscrews, the reciprocating feed for the wire and cutters for severing the wire into lengths, combined with the pivoted jaws for folding the lengths of wire, the hub around which said lengths are folded, the reciprocating slide carrying said jaws, and the chuck and mandrel for coiling the ends of said lengths, substantially as set forth.

8. In a machine for making corkscrews, the feed and cutters, combined with the table D', slide H', jaws G' G', pivoted thereon and having spring I' and shoulders P', the cap L', adjusting-screws M', finger K', hub F', and the chuck and mandrel for coiling the ends of the lengths of wire, substantially as set forth.

9. In a machine for making corkscrews, the reciprocating feed and the cutters, combined with the jaws for folding the severed lengths of wire around a hub, the reciprocating rotary chuck having the opening and stud at its head, the spirally-grooved mandrel within said chuck, the head secured to said mandrel and keyed on the chuck, and the stop for checking the rotation of the head and mandrel without interfering with the chuck, substantially as set forth.

10. In a machine for making wire corkscrews, the hub and folding devices for forming the handle of the screw, combined with the constantly-rotating chuck having the opening in the side of its head to receive the end of the wire, the spirally-grooved mandrel within said chuck for forming the worm of the corkscrew, and means, substantially as described, for engaging and disengaging the chuck and mandrel, so that the mandrel may be held stationary while the screw is being formed and then revolved to release the screw, substantially as set forth.

11. In a corkscrew-machine, the pivoted jaws G' G', having a spring I' and shoulders P' and mounted on a reciprocating slide, combined with the hub F' and the chuck and mandrel for coiling the ends of the length of wire, substantially as set forth.

12. In a corkscrew-machine, the hub and the pivoted reciprocating jaws for folding lengths of wire around said hub, combined with the reciprocating rotary chuck having the opening and stud at its head, the spirally-grooved mandrel within said chuck, the head secured to said mandrel and keyed to said chuck, and the stop for checking the rotation of the mandrel, substantially as set forth.

Signed at New York, in the county of New York and State of New York, this 29th day of August, A. D. 1888.

WILLIAM R. CLOUGH.

Witnesses.
 CHAS. C. GILL,
 R. A. PORTEOUS.